US010812777B1

(12) United States Patent
Becker et al.

(10) Patent No.: US 10,812,777 B1
(45) Date of Patent: Oct. 20, 2020

(54) ROLLING SHUTTER MOTION AND DEPTH SENSING

(71) Applicant: Amazon Technologies, Inc., Seattle, WA (US)

(72) Inventors: Gabor Szedo Becker, Newcastle, WA (US); Chengwu Luke Cui, Redmond, WA (US); Anirudth Nambirajan, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 20 days.

(21) Appl. No.: 16/177,202

(22) Filed: Oct. 31, 2018

(51) Int. Cl.
| | | |
|---|---|---|
| *H04N 13/239* | (2018.01) | |
| *H04N 13/271* | (2018.01) | |
| *G06K 9/62* | (2006.01) | |
| *B64C 39/02* | (2006.01) | |
| *G06K 9/00* | (2006.01) | |

(52) U.S. Cl.
CPC ......... *H04N 13/239* (2018.05); *B64C 39/024* (2013.01); *G06K 9/0063* (2013.01); *G06K 9/6202* (2013.01); *H04N 13/271* (2018.05); *B64C 2201/027* (2013.01); *B64C 2201/127* (2013.01); *B64C 2201/141* (2013.01)

(58) Field of Classification Search
CPC ........................... H04N 5/2329; H04N 5/3532
See application file for complete search history.

(56) References Cited

U.S. PATENT DOCUMENTS

| | | | | |
|---|---|---|---|---|
| 2009/0153710 | A1* | 6/2009 | John | ................... H04N 5/23248 348/296 |
| 2014/0198184 | A1* | 7/2014 | Stein | ................... G06K 9/00791 348/47 |
| 2017/0032503 | A1* | 2/2017 | Raichman | ............. G06T 3/0093 |
| 2018/0288388 | A1* | 10/2018 | Hicks | ................... H04N 13/254 |
| 2019/0244379 | A1* | 8/2019 | Venkataraman | ..... G06N 3/0454 |

* cited by examiner

*Primary Examiner* — Clifford Hilaire
(74) *Attorney, Agent, or Firm* — Athorus, PLLC

(57) ABSTRACT

Described is an imaging component that utilizes two rolling shutter sensors for motion detection of objects and for depth mapping of objects within an effective field of view of the imaging component. Unlike traditional stereo cameras that utilize global shutter sensors to avoid distortions, or attempting to remove distortions created by rolling shutter sensors, the disclosed implementations emphasize the distortions created by rolling shutters imaging moving objects and utilize that information to determine that the objects are moving and/or to determine a range or distance of the object from the imaging component. For example, a first rolling shutter sensor is oriented in a first orientation such that the scanlines generate the image from a top of the sensor to the bottom of the sensor, and a second rolling shutter sensor is oriented in a second orientation such that the scanlines generate the image from a bottom of the sensor to the top of the sensor. In other words, the two rolling shutter sensors have opposite orientations in the imaging component. As a result, the distortions of a moving object imaged by the two sensors are opposite and easily distinguished between the two images.

19 Claims, 8 Drawing Sheets

ROLLING SHUTTER MOTION AND DEPTH SENSING

BACKGROUND

Depth sensing and object detection for aerial vehicles, such as unmanned aerial vehicles ("UAV"), continues to increase in importance. For example, determining the distance to an object is critical for autonomous or semi-autonomous vehicle navigation, collision avoidance, etc. Currently, many system utilize stereo cameras to detect and determine distances to objects.

Stereo cameras determine object distance by comparing images generated by two sensors that are at a known distance from one another. Because the two sensors are separated, the edges, corners and other features of imaged objects are at slightly different angles between the two sensors. The stereo camera relies on these differences, also known as disparity, to determine depth information for a scene. However, moving objects may interfere with this process if the moving objects are not imaged by the two sensors at the same time. As a result, traditional stereo cameras rely on synchronized global shutter sensors that image an entire scene at the same time to eliminate motion related distortions.

Global shutter sensors, also referred to herein as global shutters, have an additional layer of storage transistors which reduce the optically sensitive portion of the pixels, resulting in a lower fill factor and a lower signal to noise ratio. This additional layer of storage is necessary because all the pixel values are read at once when the image is created. As a result, the cameras are large, heavy, expensive, and require additional power.

In comparison, rolling shutter sensors generate an image of a scene by scanning across the scene either vertically or horizontally and generate the image at each scanline. While rolling shutter sensors work for objects that are stationary with respect to the sensor, due to the time difference in which the scanlines are generated, distortion or artifacts are produced for moving objects that are represented in the scene. Distortions typically generated from moving objects imaged with a rolling shutter sensor are skew and spatial aliasing. Skew is a distortion in which the image bends diagonally in one direction or another as the camera or subject moves from one side to another, exposing different parts of the image at different times. Spatial aliasing results when vertically adjacent pixels are sampled in violation of the shutter sample theorem. Spatial aliasing often results from very fast moving objects, such as propeller blades.

Because of these distortions, rolling shutters produce unreliable results when used in traditional stereo cameras. For example, if two rolling shutter sensors are utilized to image a scene that includes an object that is moving with respect to the stereo camera, the object will appear distorted in both images. In addition, because depth information is produced from features of the object (e.g., edges, corners, sides, texture) represented in the images, the depth information may not be accurate, due to the apparent distortion.

Attempts to use rolling shutters in stereo cameras for depth sensing have focused on reducing the rolling shutter distortion by image registration followed by disparity mapping between the image pairs generated by the two rolling shutter sensors of the stereo camera. However, rolling shutter distortions are depth dependent and as such they can contribute to depth sensing inaccuracies.

BRIEF DESCRIPTION OF THE DRAWINGS

The detailed description is set forth with reference to the accompanying figures. In the figures, the left-most digit(s) of a reference number identifies the figure in which the reference number appears.

DETAILED DESCRIPTION

This disclosure describes an imaging component, also referred to herein as a stereo camera, for use in depth mapping of objects within a field of view of the imaging component. Unlike traditional stereo cameras that utilize global shutter sensors to avoid distortions, the disclosed implementations describe an imaging component that utilizes rolling shutter sensors. Likewise, opposite other attempts to utilize rolling shutter sensors for depth mapping that aim to adjust or eliminate the difference between the distortion of moving objects caused by the sequential scanning of the scanlines of each rolling shutter sensor, the described implementations emphasize the difference between the distortion in the two images. For example, a first rolling shutter sensor is oriented in a first orientation such that the scanlines generate the image from a top of the sensor to the bottom of the sensor, and a second rolling shutter sensor is oriented in a second orientation such that the scanlines generate the image from a bottom of the sensor to the top of the sensor. In other words, the two rolling shutter sensors have opposite orientations in the imaging component. As a result, the distortions of a moving object imaged by the two sensors are opposite and easily distinguished between the two images. This is in contrast to other devices that use two rolling shutter sensors that are oriented in the same direction and produce images with similar distortions.

By orienting the rolling shutter sensors in opposite directions to emphasize the distortion between the two images, an object that is moving with respect to the imaging component can be easily detected by an image comparison algorithm. Likewise, the magnitude of the difference between the distortions of the two images will be increased the closer the object is to the imaging component and/or the faster the object is moving with respect to the imaging component.

Figure 1:
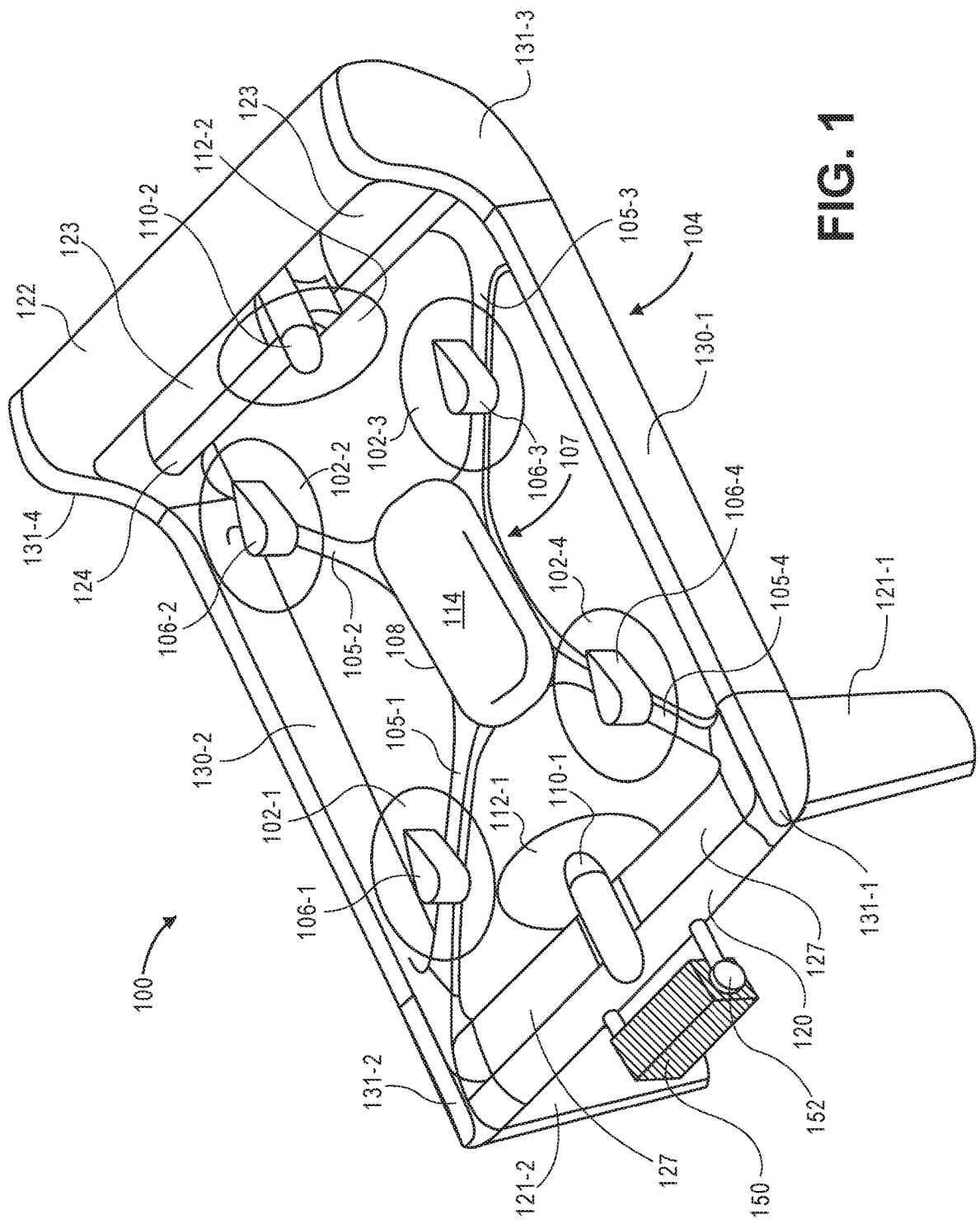
FIG. 1 depicts a view of an unmanned aerial vehicle configuration, according to an implementation.

FIG. 1 illustrates a view of a UAV 100, according to an implementation. As illustrated, the UAV 100 includes a perimeter frame 104 that includes a front wing 120, a lower rear wing 124, an upper rear wing 122, and two horizontal side rails 130-1, 130-2. The horizontal side rails 130 are coupled to opposing ends of the front wing 120 and opposing ends of the upper rear wing 122 and lower rear wing 124. In some implementations, the coupling may be with a corner junction, such as the front left corner junction 131-1, the front right corner junction 131-2, the rear left corner junction 131-3, the rear right corner junction 131-4. In such an example, the corner junctions are also part of the perimeter frame 104.

The components of the perimeter frame 104, such as the front wing 120, lower rear wing 124, upper rear wing 122, side rails 130-1, 130-2, and corner junctions 131 may be formed of any one or more suitable materials, such as graphite, carbon fiber, aluminum, titanium, etc., or any combination thereof. In the illustrated example, the components of the perimeter frame 104 of the UAV 100 are each formed of carbon fiber and joined at the corners using corner junctions 131. The components of the perimeter frame 104 may be coupled using a variety of techniques. For example, if the components of the perimeter frame 104 are carbon fiber, they may be fitted together and joined using secondary bonding, a technique known to those of skill in the art. In other implementations, the components of the perimeter frame 104 may be affixed with one or more attachment mechanisms, such as screws, rivets, latches, quarter-turn fasteners, etc., or otherwise secured together in a permanent or removable manner.

The front wing 120, lower rear wing 124, and upper rear wing 122 are positioned in a tri-wing configuration and each wing provides lift to the UAV 100 when the UAV is moving in a direction that includes a horizontal component, also referred to herein as transit flight. For example, the wings may each have an airfoil shape that causes lift due to the airflow passing over the wings during transit flight.

Opposing ends of the front wing 120 may be coupled to a corner junction 131, such as the front left corner junction 131-1 and front right corner junction 131-2. In some implementations, the front wing may include one or more flaps 127 or ailerons, that may be used to adjust the pitch, yaw, and/or roll of the UAV 100 alone or in combination with the lifting motors 106, lifting propellers 102, thrusting motors 110, thrusting propellers 112, and/or other flaps on the rear wings, discussed below. In some implementations, the flaps 127 may also be used as a protective shroud to further hinder access to the lifting propellers 102 by objects external to the UAV 100. For example, when the UAV 100 is moving in a vertical direction or hovering, the flaps 127 may be extended to increase the height of the protective barrier around a portion of the lifting propellers 102.

In some implementations, the front wing 120 may include two or more pairs of flaps 127, as illustrated in FIG. 1. In other implementations, for example if there is no front thrusting motor 110-1, the front wing 120 may only include a single flap 127 that extends substantially the length of the front wing 120. If the front wing 120 does not include flaps 127, the lifting motors 106 and lifting propellers 102, thrusting motors 110, thrusting propellers 112 and/or flaps of the rear wings may be utilized to control the pitch, yaw, and/or roll of the UAV 100 during flight.

Opposing ends of the lower rear wing 124 may be coupled to a corner junction 131, such as the rear left corner junction 131-3 and rear right corner junction 131-4. In some implementations, the lower rear wing may include one or more flaps 123 or ailerons, that may be used to adjust the pitch, yaw and/or roll of the UAV 100 alone or in combination with the lifting motors 106, lifting propellers 102, thrusting motors 110, thrusting propellers 112, and/or the flaps 127 of the front wing. In some implementations, the flaps 123 may also be used as a protective shroud to further hinder access to the lifting propellers 102 by objects external to the UAV 100. For example, when the UAV 100 is moving in a vertical direction or hovering, the flaps 123 may be extended, similar to the extending of the front flaps 127 of the front wing 120.

In some implementations, the rear wing 124 may include two or more flaps 123, as illustrated in FIG. 1 or two or more pairs of flaps. In other implementations, for example if there is no rear thrusting motor 110-2 mounted to the lower rear wing, the rear wing 124 may only include a single flap 123 that extends substantially the length of the lower rear wing 124. In other implementations, if the lower rear wing includes two thrusting motors, the lower rear wing may be configured to include three flaps 123, one on either end of the lower rear wing 124, and one between the two thrusting motors mounted to the lower rear wing 124.

Opposing ends of the upper rear wing 122 may be coupled to a corner junction 131, such as the rear left corner junction 131-3 and rear right corner junction 131-4. In some implementations, like the lower rear wing, the upper rear wing 122 may include one or more flaps or ailerons, that may be used to adjust the pitch, yaw and/or roll of the UAV 100 alone or in combination with the lifting motors 106, lifting propellers 102, thrusting motors 110, thrusting propellers 112, and/or other flaps of other wings. In some implementations, the flaps may also be used as a protective shroud to further hinder access to the lifting propellers 102 by objects external to the UAV 100. For example, when the UAV 100 is moving in a vertical direction or hovering, the flaps may be extended, similar to the extending of the front flaps 127 of the front wing 120 or the flaps 123 of the lower rear wing.

The front wing 120, lower rear wing 124, and upper rear wing 122 may be positioned and sized proportionally to provide stability to the UAV while the UAV 100 is moving in a direction that includes a horizontal component. For example, the lower rear wing 124 and the upper rear wing 122 are stacked vertically such that the vertical lift vectors generated by each of the lower rear wing 124 and upper rear wing 122 are close together, which may be destabilizing during horizontal flight. In comparison, the front wing 120 is separated from the rear wings longitudinally such that the vertical lift vector generated by the front wing 120 acts together with the vertical lift vectors of the lower rear wing 124 and the upper rear wing 122, providing efficiency, stabilization and control.

In some implementations, to further increase the stability and control of the UAV 100, one or more winglets 121, or stabilizer arms, may also be coupled to and included as part of the perimeter frame 104. In the example illustrated with respect to FIG. 1, there are two front winglets 121-1 and 121-2 mounted to the underneath side of the front left corner junction 131-1 and the front right corner junction 131-2, respectively. The winglets 121 extend in a downward direction approximately perpendicular to the front wing 120 and side rails 130. Likewise, the two rear corner junctions 131-3, 131-4 are also formed and operate as winglets providing additional stability and control to the UAV 100 when the UAV 100 is moving in a direction that includes a horizontal component, such as transit flight.

Coupled to the interior of the perimeter frame 104 is a central frame 107. The central frame 107 includes a hub 108 and motor arms 105 that extend from the hub 108 and couple to the interior of the perimeter frame 104. In this example, there is a single hub 108 and four motor arms 105-1, 105-2, 105-3, and 105-4. Each of the motor arms 105 extend from approximately a corner of the hub 108 and couple or terminate into a respective interior corner of the perimeter frame. In some implementations, each motor arm 105 may couple into a corner junction 131 of the perimeter frame 104. Like the perimeter frame 104, the central frame 107 may be formed of any suitable material, such as graphite, carbon fiber, aluminum, titanium, etc., or any combination thereof. In this example, the central frame 107 is formed of carbon fiber and joined at the corners of the perimeter frame 104 at the corner junctions 131. Joining of the central frame 107 to the perimeter frame 104 may be done using any one or more of the techniques discussed above for joining the components of the perimeter frame 104.

Lifting motors 106 are coupled at approximately a center of each motor arm 105 so that the lifting motor 106 and corresponding lifting propeller 102 are within the substantially rectangular shape of the perimeter frame 104. In one implementation, the lifting motors 106 are mounted to an underneath or bottom side of each motor arm 105 in a downward direction so that the propeller shaft of the lifting motor that mounts to the lifting propeller 102 is facing downward. In other implementations, as illustrated in FIG. 1, the lifting motors 106 may be mounted to a top of the motor arms 105 in an upward direction so that the propeller shaft of the lifting motor that mounts to the lifting propeller 102 is facing upward. In this example, there are four lifting motors 106-1, 106-2, 106-3, 106-4, each mounted to an upper side of a respective motor arm 105-1, 105-2, 105-3, and 105-4.

In some implementations, multiple lifting motors may be coupled to each motor arm 105. For example, while FIG. 1 illustrates a quad-copter configuration with each lifting motor mounted to a top of each motor arm, a similar configuration may be utilized for an octo-copter. For example, in addition to mounting a motor 106 to an upper side of each motor arm 105, another lifting motor may also be mounted to an underneath side of each motor arm 105 and oriented in a downward direction. In another implementation, the central frame may have a different configuration, such as additional motor arms. For example, eight motor arms may extend in different directions and a lifting motor may be mounted to each motor arm.

The lifting motors may be any form of motor capable of generating enough rotational speed with the lifting propellers 102 to lift the UAV 100 and any engaged payload, thereby enabling aerial transport of the payload.

Mounted to each lifting motor 106 is a lifting propeller 102-1, 102-2, 102-3, and 102-4. The lifting propellers 102 may be any form of propeller (e.g., graphite, carbon fiber) and of a size sufficient to lift the UAV 100 and any payload engaged by the UAV 100 so that the UAV 100 can navigate through the air, for example, to deliver a payload to a delivery location. For example, the lifting propellers 102 may each be carbon fiber propellers having a dimension or diameter of twenty-four inches.

While the illustration of FIG. 1 shows the lifting propellers 102 all of a same size, in some implementations, one or more of the lifting propellers 102 may be different sizes and/or dimensions. Likewise, while this example includes four lifting propellers 102-1, 102-2, 102-3, 102-4, in other implementations, more or fewer propellers may be utilized as lifting propellers 102. Likewise, in some implementations, the lifting propellers 102 may be positioned at different locations on the UAV 100. In addition, alternative methods of propulsion may be utilized as either lifting motors or thrusting "motors" in implementations described herein. For example, fans, jets, turbojets, turbo fans, jet engines, internal combustion engines, and the like may be used (either with propellers or other devices) to provide lift for the UAV.

In addition to the lifting motors 106 and lifting propellers 102, the UAV 100 may also include one or more thrusting motors 110 and corresponding thrusting propellers 112. The thrusting motors and thrusting propellers may be the same or different than the lifting motors 106 and lifting propellers 102. For example, in some implementations, the thrusting propellers may be formed of carbon fiber and be approximately eighteen inches long. In other implementations, the thrusting motors may utilize other forms of propulsion to propel the UAV. For example, fans, jets, turbojets, turbo fans, jet engines, internal combustion engines, and the like may be used (either with propellers or with other devices) as the thrusting motors.

The thrusting motors and thrusting propellers may be oriented at approximately ninety degrees with respect to the perimeter frame 104 and central frame 107 of the UAV 100 and utilized to increase the efficiency of flight that includes a horizontal component. For example, during transit flight, flight that includes a horizontal component, the thrusting motors may be engaged to provide a horizontal thrust force via the thrusting propellers to propel the UAV 100 horizontally. As a result, the speed and power utilized by the lifting motors 106 may be reduced. Alternatively, in selected implementations, the thrusting motors may be oriented at an angle greater or less than ninety degrees with respect to the perimeter frame 104 and the central frame 107 to provide a combination of thrust and lift.

In the example illustrated in FIG. 1, the UAV 100 includes two thrusting motors 110-1, 110-2 and corresponding thrusting propellers 112-1, 112-2. Specifically, in the illustrated example, there is a front thrusting motor 110-1 coupled to and positioned near an approximate mid-point of the front wing 120. The front thrusting motor 110-1 is oriented such that the corresponding thrusting propeller 112-1 is positioned inside the perimeter frame 104. The second thrusting motor is coupled to and positioned near an approximate mid-point of the lower rear wing 124. The rear thrusting motor 110-2 is oriented such that the corresponding thrusting propeller 112-2 is positioned inside the perimeter frame 104.

While the example illustrated in FIG. 1 illustrates the UAV with two thrusting motors 110 and corresponding thrusting propellers 112, in other implementations, there may be fewer or additional thrusting motors and corresponding thrusting propellers. For example, in some implementations, the UAV 100 may only include a single rear thrusting motor 110 and corresponding thrusting propeller 112. In another implementation, there may be two thrusting motors and corresponding thrusting propellers mounted to the lower rear wing 124. In such a configuration, the front thrusting motor 110-1 may be included or omitted from the UAV 100. Likewise, while the example illustrated in FIG. 1 shows the thrusting motors oriented to position the thrusting propellers inside the perimeter frame 104, in other implementations, one or more of the thrusting motors 110 may be oriented such that the corresponding thrusting propeller 112 is oriented outside of the protective frame 104.

In the illustrated example, the UAV also includes an imaging component 150 that is coupled to the frame 104 of the UAV with a gimbal 152. The imaging component 150 is discussed in further detail below with respect to FIG. 2. The gimbal 152 may be a one, two, or three axis gimbal that is used to alter an orientation and/or position of the imaging component 150. Imaging components 150, in which the orientation, angle, or other position of the imaging component are adjustable with respect to the UAV 100, are referred to herein as adjustable imaging components. In other implementations, the imaging component may be directly coupled to and/or incorporated into the frame 104 of the UAV 100. Such imaging components 150, in which the orientation, angle, or other position of the imaging component is not adjustable with respect to the UAV 100 is referred to herein as a fixed imaging component. Regardless, for purposes of discussion, fixed imaging components and adjustable imaging component are referred to herein collectively as imaging components, unless specifically referenced otherwise.

While the example illustrated in FIG. 1 presents a single imaging component 150 coupled to a front of the UAV 100, in other implementations, multiple imaging components may be coupled to the UAV at any positions on the UAV. For example, the UAV may include fixed imaging components coupled at each corner junction 131-1, 131-2, 131-3, 131-4 and adjustable imaging components coupled to each side of the UAV.

The perimeter frame 104 provides safety for objects foreign to the UAV 100 by inhibiting access to the lifting propellers 102 from the side of the UAV 100, provides protection to the UAV 100, and increases the structural integrity of the UAV 100. For example, if the UAV 100 is traveling horizontally and collides with a foreign object (e.g., wall, building), the impact between the UAV 100 and the foreign object will be with the perimeter frame 104, rather than a propeller. Likewise, because the frame is interconnected with the central frame 107, the forces from the impact are dissipated across both the perimeter frame 104 and the central frame 107.

The perimeter frame 104 also provides a surface upon which one or more components of the UAV 100 may be mounted. Alternatively, or in addition thereto, one or more components of the UAV may be mounted or positioned within the cavity of the portions of the perimeter frame 104. For example, antennas may be included in the cavity of the perimeter frame and be used to transmit and/or receive wireless communications. The antennas may be utilized for Wi-Fi, satellite, near field communication ("NFC"), cellular communication, or any other form of wireless communication. Other components, such as cameras, time of flight sensors, accelerometers, inclinometers, distance-determining elements, gimbals, Global Positioning System (GPS) receiver/transmitter, radars, illumination elements, speakers, and/or any other component of the UAV 100 or the UAV control system (discussed below), etc., may likewise be mounted to or in the perimeter frame 104. Likewise, identification or reflective identifiers may be mounted to the perimeter frame 104 to aid in the identification of the UAV 100.

In some implementations, the perimeter frame 104 may also include a permeable material (e.g., mesh, screen) that extends over the top and/or lower surface of the perimeter frame 104 enclosing the central frame, lifting motors, and/or lifting propellers.

A UAV control system 114 is also mounted to the central frame 107. In this example, the UAV control system 114 is mounted to the hub 108 and is enclosed in a protective barrier. The protective barrier may provide the control system 114 weather protection so that the UAV 100 may operate in rain and/or snow without disrupting the control system 114. In some implementations, the protective barrier may have an aerodynamic shape to reduce drag when the UAV is moving in a direction that includes a horizontal component. The protective barrier may be formed of any materials including, but not limited to, graphite-epoxy, Kevlar, and/or fiberglass. In some implementations, multiple materials may be utilized. For example, Kevlar may be utilized in areas where signals need to be transmitted and/or received.

Likewise, the UAV 100 includes one or more power modules. The power modules may be positioned inside the cavity of the side rails 130-1, 130-2. In other implementations, the power modules may be mounted or positioned at other locations of the UAV. The power modules for the UAV may be in the form of battery power, solar power, gas power, super capacitor, fuel cell, alternative power generation source, or a combination thereof. For example, the power modules may each be a 6000 mAh lithium-ion polymer battery, or polymer lithium ion (Li-poly, Li-Pol, LiPo, LIP, PLI or Lip) battery. The power module(s) are coupled to and provide power for the UAV control system 114, the lifting motors 106, the thrusting motors 110, and the payload engagement mechanism (not shown).

In some implementations, one or more of the power modules may be configured such that it can be autonomously removed and/or replaced with another power module while the UAV is landed or in flight. For example, when the UAV lands at a location, the UAV may engage with a charging member at the location that will recharge the power module.

As mentioned above, the UAV 100 may also include a payload engagement mechanism. The payload engagement mechanism may be configured to engage and disengage items and/or containers that hold items (payload). In this example, the payload engagement mechanism is positioned beneath and coupled to the hub 108 of the frame 104 of the UAV 100. The payload engagement mechanism may be of any size sufficient to securely engage and disengage a payload. In other implementations, the payload engagement mechanism may operate as the container in which it contains item(s). The payload engagement mechanism communicates with (via wired or wireless communication) and is controlled by the UAV control system 114.

Figure 2:
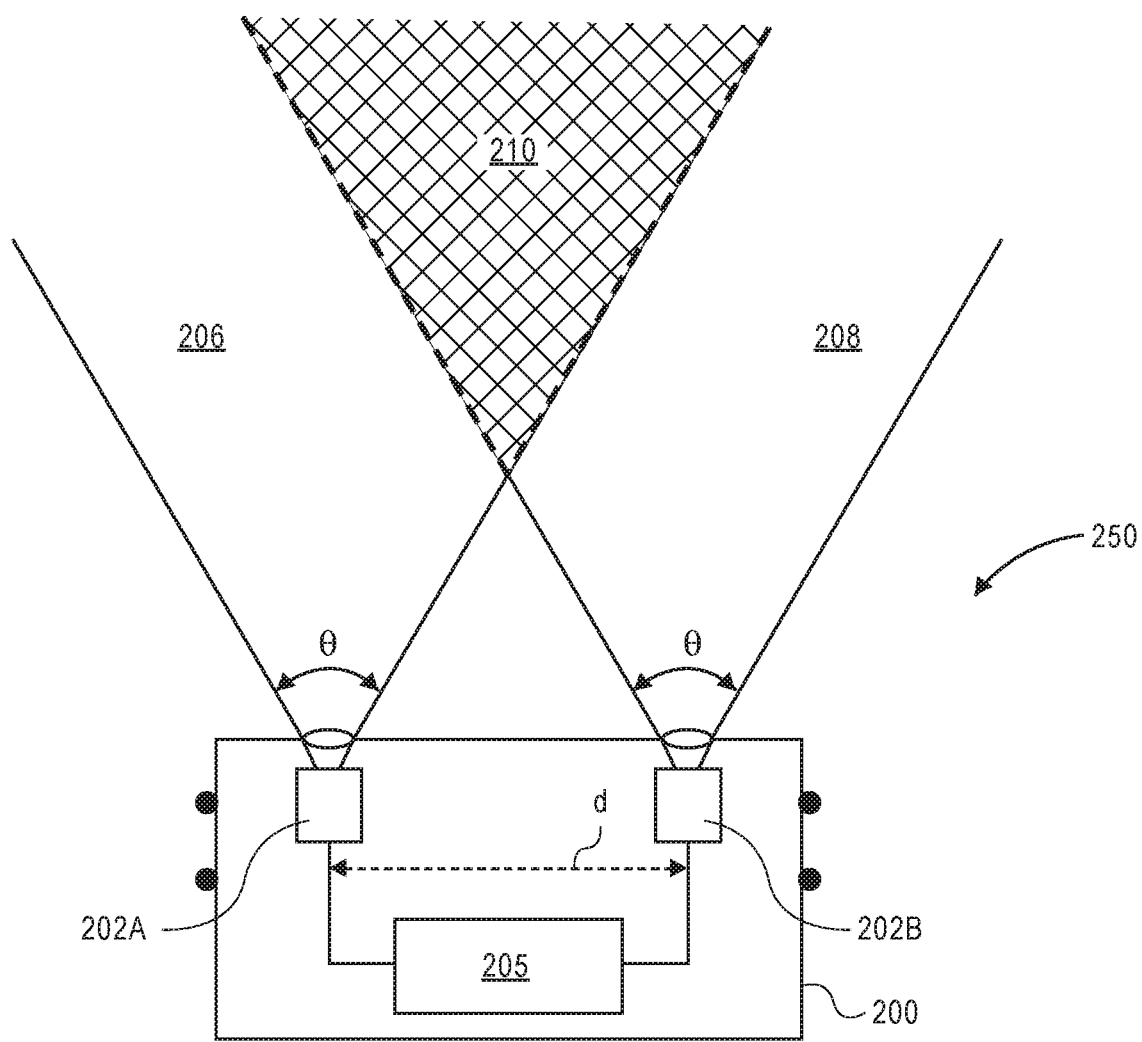
FIG. 2 illustrates an imaging component that may be used with a vehicle, according to an implementation.

FIG. 2 illustrates an imaging component 250 that may be used with and coupled to a vehicle, such as the UAV 100 discussed above with respect to FIG. 1, another aerial vehicle, a ground based vehicle, or a water based vehicle, according to an implementation. Likewise, the imaging component and described implementations may likewise be permanently or temporarily affixed at stationary locations.

In this example, the imaging component 250 includes two rolling shutter sensors 202A and 202B, both of which are affixed to a frame 200 at a defined baseline distance ("d") from one another. Any type of rolling shutter sensor may be used with the implementations described herein. Uniquely, the first rolling shutter sensor 202A has a first orientation such that the scanlines of the rolling shutter sensor 202A generate the image from a top of the sensor down to the bottom of the sensor. In comparison, the second rolling shutter sensor 202B is oriented such that the scanlines of the rolling shutter sensor 202B generate the image from the bottom of the sensor up to the top of the sensor. In other implementations, the rolling shutter sensors may have different orientations. For example, one of the rolling shutter sensors may be oriented to scan left to right and the other rolling shutter sensor may be oriented to scan right to left. In still other examples, one of the rolling shutter sensors may be oriented to scan top to bottom or bottom to top while the second rolling shutter sensor may be oriented to scan left to right or right to left.

Additionally, in some implementations, each rolling shutter sensor may simply be part of a camera module or other imaging component that includes a lens and rolling shutter sensor. As is known in the art, the rolling shutter sensor may convert an optical image obtained at each scanline into a digital signal or digital representation of the image (generally referred to herein as image data). In one implementation, the rolling shutter sensors may be a RGB sensor capable of supporting an image resolution of at least 860× 480 at six frames per second. The rolling shutter sensor may likewise be configured to provide the image data to other components (e.g., a graphics processing unit) for processing. In some implementations, cameras, such as visual cameras, may be paired to provide stereo imagery and depth information. A stereo camera may include a pair of camera modules or a pair of rolling shutter sensors. Image data may be stored in any variety of formats including, but not limited to, YUYV, RGB, RAW, .bmp, .jpeg, .gif, or the like.

Returning to FIG. 2, the rolling shutter sensors 202A and 202B are coupled to a frame at fixed positions and orientations with respect to one another and separated by a known baseline distance (d). The rolling shutter sensors 202A, 202B have a similar field of view 206, 208. In other implementations, the rolling shutter sensors may have different fields of view that at least partially overlap to form an effective field of view 210. Objects positioned within the effective field of view 210 are detectable by both rolling shutter sensors 202A and 202B and images formed by the two sensors will both include representations of the object within the effective field of view 210.

During pairing, the two rolling shutter sensors 202A and 202B are calibrated such that the pixel information for each correspond to portions within the effective field of view 210 are correlated such that image information within the effective field of view from the two paired rolling shutter sensors 202A, 202B can be merged and, with knowledge of the baseline distance (d), depth information for objects within the field of view may be generated. The depth information may be associated with the corresponding pixel information to form a depth map corresponding to the scene within the effective field of view 210. In this example, the two rolling shutter sensors 202A and 202B are paired and calibrated with the processing component 205. As images are formed by each of the rolling shutter sensors 202A, 202B, the formed visual images are sent to the processing component 205 and the processing component 205 processes the two images using the calibration information to determine any objects that have distortions due to movement of the object with respect to the camera during image creation by the rolling shutter sensors. In addition, the processing component 202 may utilize the images to generate depth information for objects within the effective field of view 210. The resulting depth information may be used to generate a depth map representative of the scene.

As discussed above, the orientation of the two rolling shutter sensors are different. By having different orientations for the two rolling shutter sensors, any distortion in the resulting image data caused by movement of an object with respect to the camera in the effective field of view will be emphasized between the two images.

During operation, images obtained of a scene (e.g., delivery location, landing location, etc.) within the effective field of view 210 by the two rolling shutter sensors 202A, 202B are provided to the same processing component 205 of the imaging component 250. The processing component utilizes the associated pixel information to process the visual images received from the rolling shutter sensors to detect objects that have opposing distortions. Likewise, the processing component 205 may determine depth information for objects represented in the images. In some implementations, the processing component may correlate a different color of a series of colors and/or value of a series of values to represent different distances between the camera and objects within the field of view of the camera.

While the illustrated example utilizes a single processing component 205 that is part of the imaging component 250, in other implementations the imaging component 250 may include multiple processing components that operate in conjunction or independently to perform the described implementations. In still other examples, the imaging component 250 may not include a processing component and formed images may be sent directly from the imaging component 250 to other components, such as one or more components of the UAV control system, for further processing. In yet another example, the formed images, and/or determined information (e.g., movement, distortion) may be transmitted from the UAV to another computing system, such as a remote computing system for processing.

Figure 3:
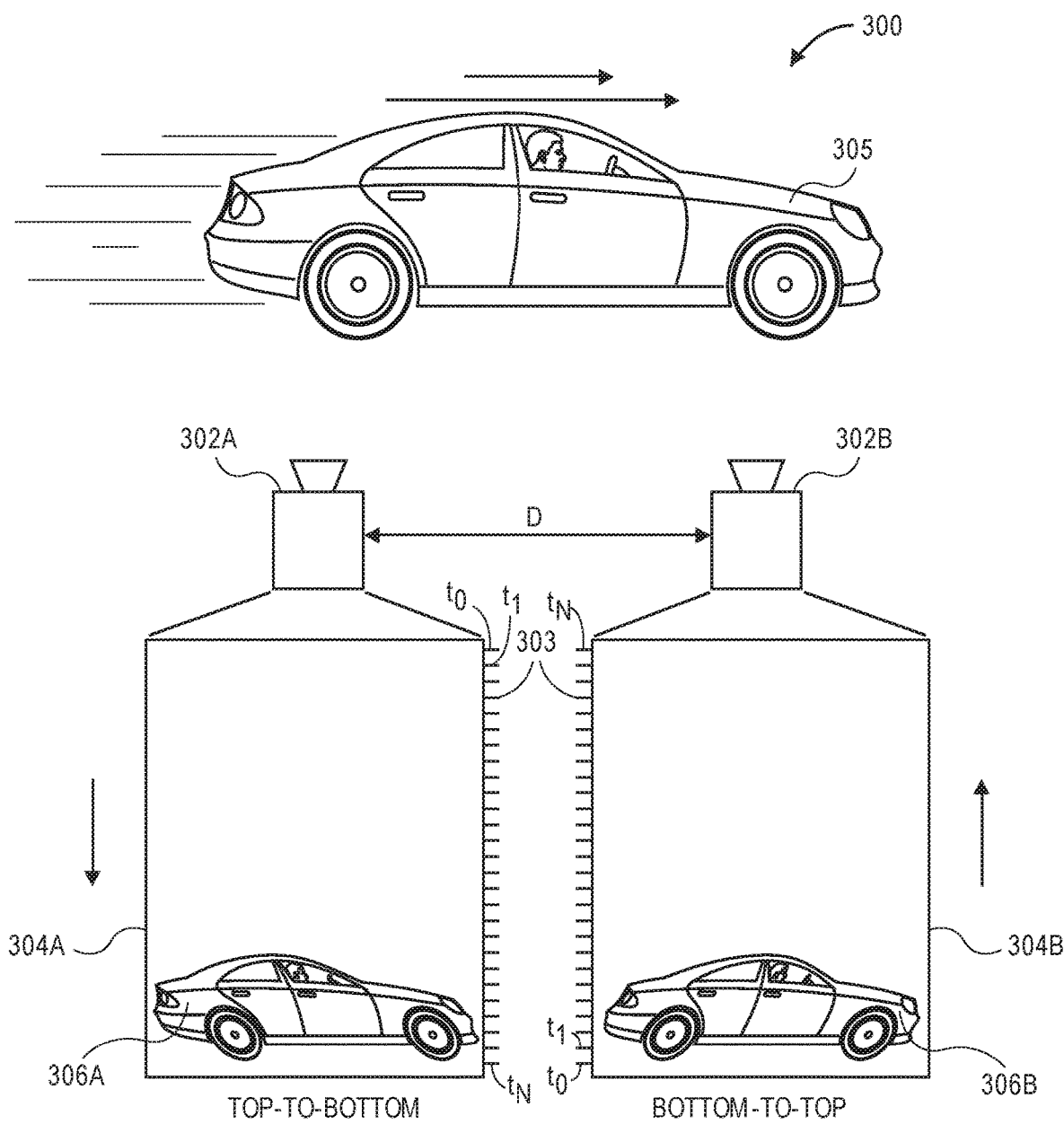
FIG. 3 illustrates an image of a scene generated by the top-to-bottom rolling shutter and the bottom-to-top rolling shutter of the example imaging component of FIG. 2, according to an implementation.

FIG. 3 illustrates an image of a scene generated by the top-to-bottom rolling shutter sensor and the bottom-to-top rolling shutter sensor of the example imaging component of FIG. 2, according to an implementation. In this example, the scene 300 includes an automobile 305 that is moving at a high speed/velocity through the effective field of view of the two rolling shutter sensors 302A, 302B. The two rolling shutter sensors create image data of the scene by generating the image data at a plurality of scanlines 303. Because the first rolling shutter sensor is oriented to generate images from the top of the rolling shutter sensor to the bottom, at an initial time ($t_0$) a top-most scanline generates pixel data of the scene 300. Likewise, because the second rolling shutter sensor is oriented to generate images from the bottom of the rolling shutter sensor to the top, at the initial time ($t_0$) a bottom-most scanline generates pixel data of the scene 300. The two sensors continue forward in time from $t_0$, $t_1$, through $t_N$ generating image data at each scanline to produce the resulting images 304A and 304B, respectively.

Due to the movement of the vehicle 305 during the time that the scanlines generate the images 304A, 304B, the representation of the vehicle 305 in each of those images is distorted. For example, the representation 306A of the vehicle in the image 304A generated by the first rolling shutter sensor that generates the images from the top-down appears to be slanting or skewed backward because the scanlines that produced the image data representing the top of the vehicle were captured first. In comparison, the representation 306B of the vehicle in the image 304B generated by the second rolling shutter sensor that generates the images from the bottom-up appears to be slanting or skewed forward because the scanlines that produced the image data representing the bottom of the vehicle were captured first. When the two images are compared the distortion is emphasized or magnified because the distortion of the same object are different in the two images.

Figure 4:
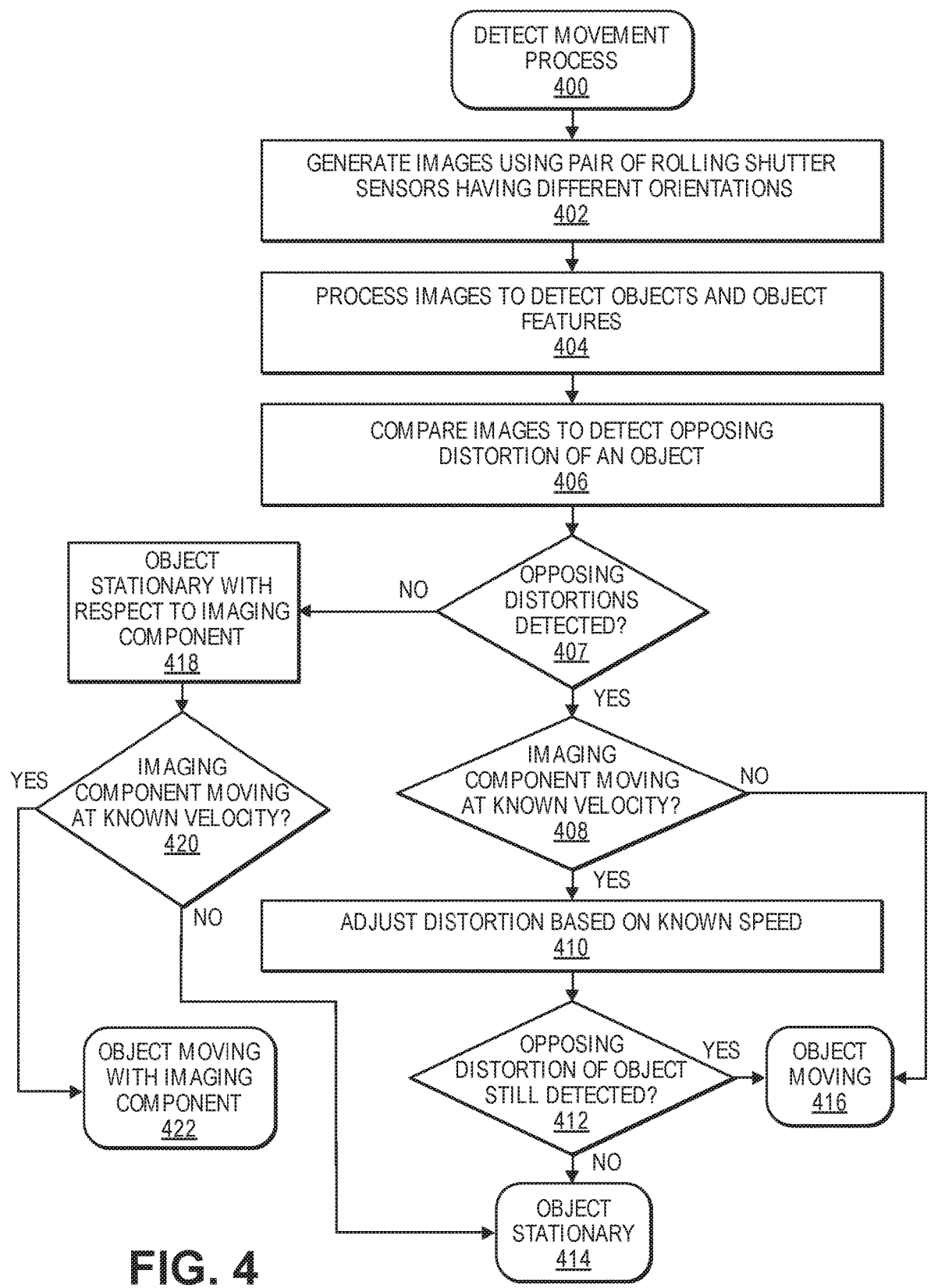
FIG. 4 is a flow diagram of an example detect movement process, according to an implementation.

FIG. 4 is a flow diagram of an example detect movement process 400, according to an implementation. The example process begins by generating image data using a pair of rolling shutter sensors of an imaging component that have different orientations, as in 402. As noted above, the rolling shutter sensors may have opposing orientations such that one scans from top to bottom and the other from bottom to top (or left to right v. right to left). In other implementations, they may be oriented at ninety degrees to one another. In still other examples, they may have different orientations.

The two images are then processed to detect objects and object features represented in the images, as in 404. Object detection in images is well known in the art and any one or more image processing, edge detection, and/or object detection algorithms may be utilized with the described implementations.

For each object and/or object feature detected in the first image, it is compared to a corresponding object or object feature in the second image to determine if the distortions are opposing, as in 406. For example, if an object is skewed to the right in a first image and skewed to the left in a second image, it will be determined that the object has opposing distortions. In comparison, traditional systems that utilize rolling shutter sensors having the same orientation would not be able to identify any opposing distortions because both images would have similar distortions because the scanlines of each rolling shutter sensor are processed at approximately the same time.

A determination is then made as to whether any opposing distortions are detected, as in 407. If it is determined that an opposing distortion is detected, a determination is made as to whether the imaging component that generated the two images is moving at a known velocity, as in 408. For example, if the imaging component is coupled to a moving vehicle, velocity data for the vehicle may be provided and used to determine the movement or velocity of the imaging component.

If the imaging component is moving, the distortions may be adjusted to account for the known velocity, as in 410. Such adjustments may be made using any now known or future distortion correction algorithm that adjusts for distortion based on a known movement of the imaging component. For example, an affine transformation algorithm may be used to correct distortion in the images.

After adjusting the two images to account for a known movement of the imaging component, the images are again compared to determine if any opposing distortions are still present between one or more objects represented in the image, as in 412. Opposing distortions may be present after image adjustments to account for movement of the imaging component when the object itself is also moving. If it is determined that opposing distortions still exist, or if it is determined at decision block 408 that the imaging component is not moving, the object represented in the images is identified as a moving object, as in 416. In comparison, if it is determined that no opposing distortions exist after adjusting the images to account for movement of the imaging component, it is determined that the object is stationary.

Returning to decision block 407, if it is determined that opposing distortions are not detected, it is determined that the objects represented in the images are stationary with respect to the imaging component, as in 418. A determination may then be made as to whether the imaging component is moving at a known velocity, as in 420. If it is determined that the imaging component is moving at a known velocity and no distortion is detected, it is determined that the object is moving with the imaging component, as in 422. In comparison, if it is determined that the imaging component is not moving, it is determined that the object is likewise stationary, as in 414.

In some implementations, some or all of the example process 400 may be performed using machine learning and/or neural networks trained to determine differing distortions of a same object represented in two images. For example, a neural network may be trained with images of known moving objects to develop a model. As images from two imaging sensors are then provided to the neural network, the neural network may process those images to determine distortions of the same object in the images that have different distortions, such distortions indicative of object movement with respect to the imaging component.

Figure 5:
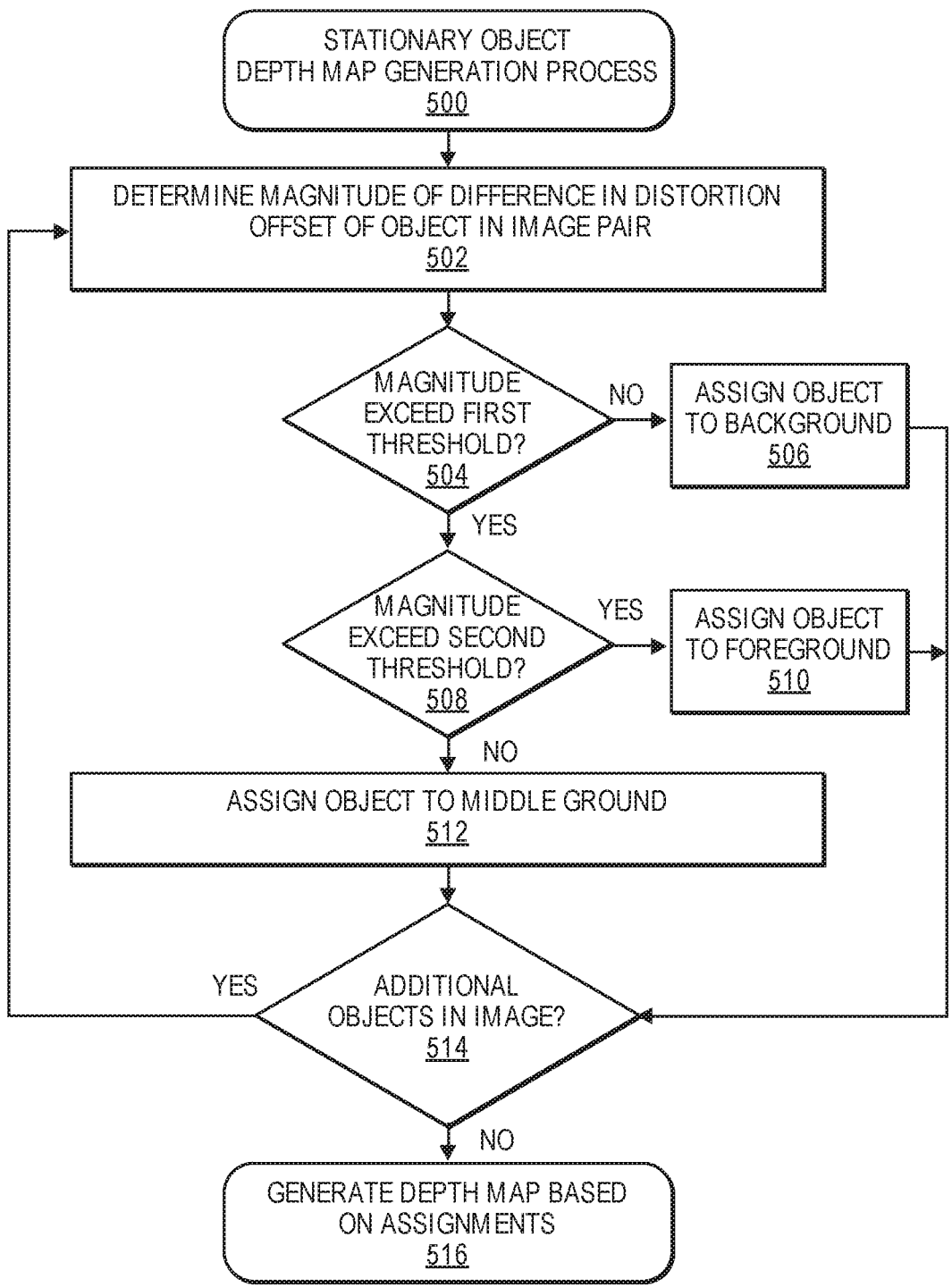
FIG. 5 is an example stationary object depth map generation process, according to an implementation.

FIG. 5 is an example stationary object depth map generation process 500, according to an implementation. In this example, a magnitude of a difference in the distortion offset of an object between two images generated by rolling shutter sensors of the described implementations is determined, as in 502. The magnitude of the difference may be computed as, for example, the distance between pixels that represent the same or similar portions of the distorted object. An average of the difference of distances between pixels of the object that represent the same or similar portions of the object in each of the images, etc.

A determination may then be made as to whether the magnitude exceeds a first threshold, as in 504. The threshold may be any defined number or other value or score and may vary for different imaging components, different times of day, different locations, etc. If it is determined that the magnitude does not exceed the first threshold, the object may be assigned to a background of the imaged scene, as in 506. As discussed further below, objects that have a larger distance from the imaging component will have a smaller magnitude difference between the distortions. In comparison, objects that are closer to the imaging component will have higher magnitudes of difference in the opposing distortions. As such, the magnitude of the difference may be utilized as an indicator of relative distance to the imaging component.

If it is determined that the magnitude does exceed the first threshold, in this example, it is determined whether the magnitude also exceeds a second threshold, as in 508. Like the first threshold, the second threshold may be any defined number or other value or score and may vary for different imaging components, different times of day, different locations, etc. Likewise, in some implementations, the second threshold may be vary and/or be a multiple of the first threshold.

If it is determined that the magnitude does exceed the first threshold but does not exceed the second threshold, the object is assigned to the middle ground of the scene, as in 512. However, if it is determined that the magnitude exceeds both the first threshold and the second threshold, the object is assigned to the foreground of the scene as being close to the imaging component, as in 510.

After assigning the object to the foreground, middle ground, or background of the scene, a determination is made as to whether any additional objects remain in the image that are to be processed and assigned to the foreground, middle ground, or background of the scene, as in 514. If it is determined that additional objects remain, the example process returns to block 502 and continues.

Once all objects have been processed, a depth map is generated based on the assignments of the objects to one of the foreground, middle ground, and background, as in 516. For example, objects assigned to the foreground may be represented as a first color in the depth map, such as a bright color, middle ground objects with another, perhaps lighter color, and background objects omitted or represented as a dark color.

While the above example utilizes two thresholds and three positions in the scene (foreground, middle ground, background) it will be appreciated that additional or fewer thresholds and corresponding positions may likewise be used with the described implementations. For example, an additional position of immediate foreground may exist for objects having a magnitude difference in offset that exceed both of the above mentioned threshold and exceed a third, still higher threshold. Such objects likely to be very close to the imaging component.

Figure 6:
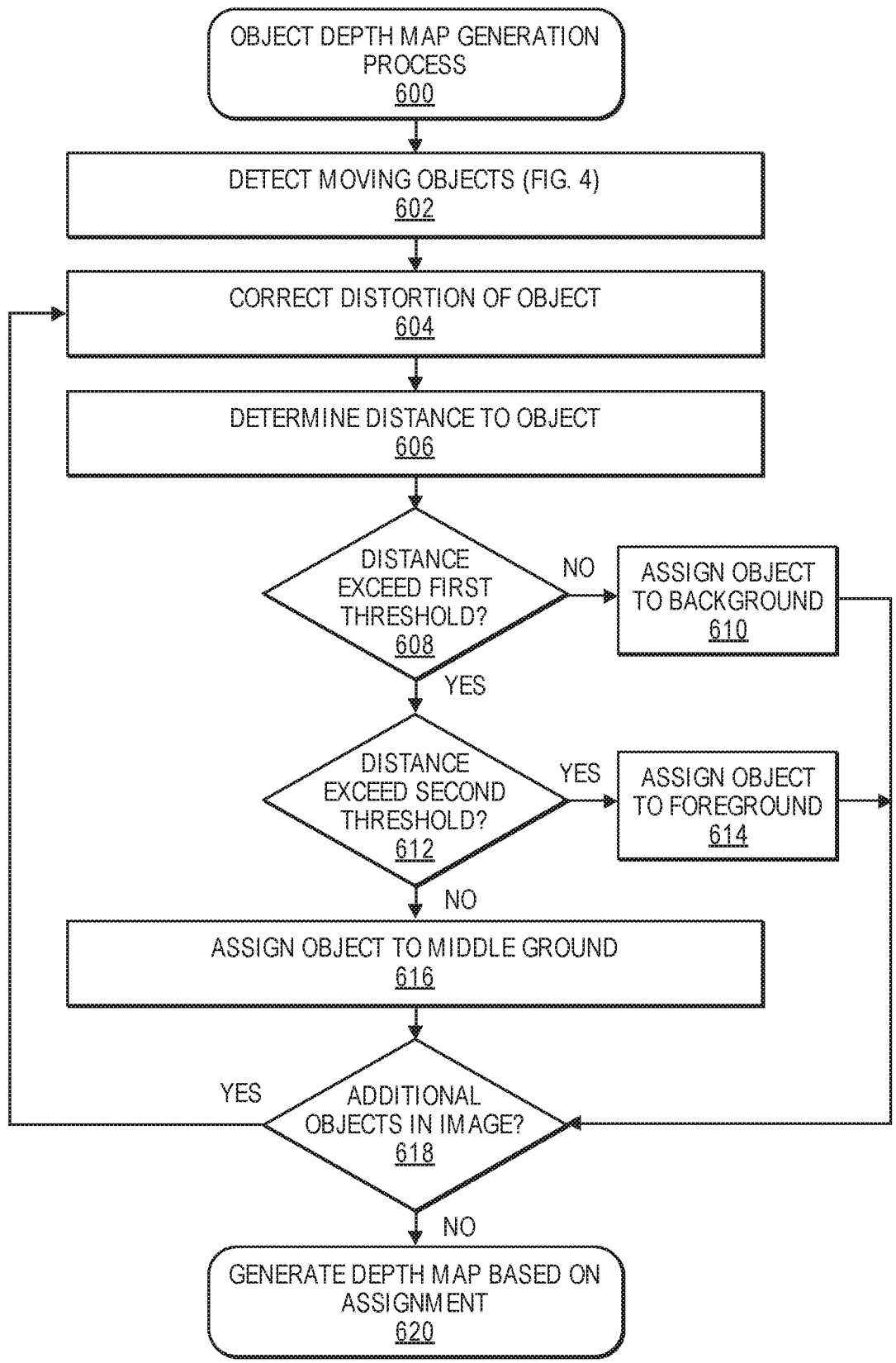
FIG. 6 is an example object depth map generation process, according to an implementation.

FIG. 6 is an example object depth map generation process 600, according to an implementation. The example process 600 may be used with objects that are stationary with respect to the imaging component and objects that are moving with respect to the imaging component.

At an initial point of receipt of two images generated by a pair of rolling shutter sensors of an imaging component, the images are processed, as discussed above with respect to FIG. 4, to determine objects that are moving with respect to the imaging component, as in 602.

For an object that is determined to be moving, the distortion of the object in the images is corrected, as in 604. In one example, one or more image processing algorithms, such as an affine transformation, may be utilized to correct distortion in the images. In another implementation, one of the images may be rotated, for example by one-hundred-and-eighty degrees so that the direction of the distortion in the two images coincide. As will be appreciated, any one or more image distortion correction techniques may be utilized.

Upon correction of the object distortion in the images, the images may then be utilized to determine a distance between the object and the imaging component, as in 606. Because the imaging sensors are set a defined distance apart, as discussed above, the disparity between the object as represented in the images may be used to compute a distance between the object and the imaging component. Such techniques of determining object distance from a pair of imaging components is well known in the art and need not be discussed in further detail herein.

A determination may then be made as to whether the distance exceeds a first threshold, as in 608. The threshold may be any defined number or other value or score and may vary for different imaging components, different times of day, different locations, etc. If it is determined that the distance does not exceed the first threshold, the object may be assigned to a background of the imaged scene, as in 610. If it is determined that the distance does exceed the first threshold, in this example, it is determined whether the distance also exceeds a second threshold, as in 612. Like the first threshold, the second threshold may be any defined number or other value or score and may vary for different imaging components, different times of day, different locations, etc. Likewise, in some implementations, the second threshold may be variable and/or be a multiple of the first threshold.

If it is determined that the distance does exceed the first threshold but does not exceed the second threshold, the object is assigned to the middle ground of the scene, as in 616. However, if it is determined that the distance exceeds both the first threshold and the second threshold, the object is assigned to the foreground of the scene as being close to the imaging component, as in 614.

After assigning the object to the foreground, middle ground, or background of the scene, a determination is made as to whether any additional objects remain in the image that are to be processed and assigned to the foreground, middle ground, or background of the scene, as in 618. If it is determined that additional objects remain, the example process 600 returns to block 604 and continues.

Once all objects have been processed, a depth map is generated based on the assignments of the objects to one of the foreground, middle ground, and background, as in 620. For example, objects assigned to the foreground may be represented as a first color in the depth map, such as a bright color, middle ground objects with another, perhaps lighter color, and background objects omitted or represented as a dark color.

While the above example utilizes two thresholds and three positions in the scene (foreground, middle ground, background) it will be appreciated that additional or fewer thresholds and corresponding positions may likewise be used with the described implementations. For example, an additional position of immediate foreground may exist for objects having a distance that exceed both of the above mentioned threshold and exceeds a third, still higher threshold. Such objects likely to be very close to the imaging component.

Figure 7:
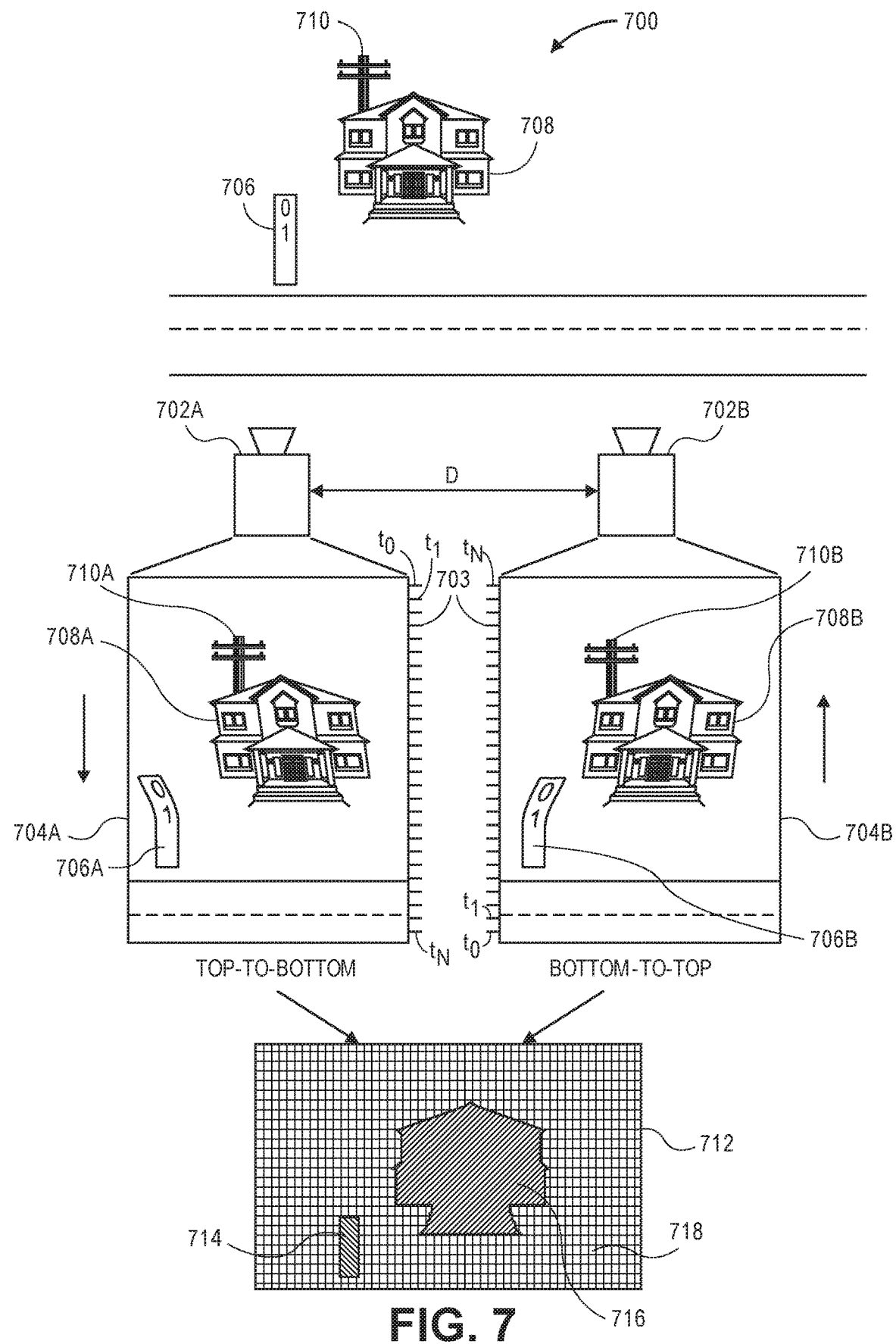
FIG. 7 illustrates a depth map produced from images generated by rolling shutter sensors of the imaging component of FIG. 2, according to an implementation.

FIG. 7 illustrates a depth map produced from images generated by rolling shutter sensors of the imaging component of FIG. 2, according to an implementation. Similar to FIG. 3, FIG. 7 illustrates an image of a scene 700 generated by the top-to-bottom rolling shutter and the bottom-to-top rolling shutter of the example imaging component of FIG. 2, according to an implementation. In comparison to FIG. 3, in this example, the imaging component that includes the rolling shutter sensors 702A, 702B is moving.

In this example, the scene 700 includes a mile marker 706, house 708, and a telephone pole 710 in the scene 700 that is in the effective field of view of the two rolling shutter sensors 702A, 702B. The two rolling shutter sensors create image data of the scene by generating the image data at a plurality of scanlines 703. Because the first rolling shutter sensor is oriented to generate images from the top of the rolling shutter sensor to the bottom, at an initial time ($t_0$) a top-most scanline generates pixel data of the scene 700. Likewise, because the second rolling shutter sensor is oriented to generate images from the bottom of the rolling shutter sensor to the top, at the initial time ($t_0$) a bottom-most scanline generates pixel data of the scene 700. The two sensors continue forward in time from to, ti, through $t_N$ generating image data at each scanline to produce the resulting images 704A and 704B, respectively.

Due to the movement of the imaging component and the rolling shutter sensors 702A, 702B of the imaging component, the representation of the objects 706, 708, 710 in each of those images 704A, 704B is distorted. Likewise, because the objects are at different distances from the imaging component, the distortion for each is different, even though the movement of the objects with respect to the imaging component is the same (because the imaging component is the only thing moving in this example). For example, the representation 706A of the mile marker 706 in the first image 704A generated by the first rolling shutter sensor that generates the image from the top-down is distorted and skewed to the left by a first amount because the scanlines that produced the image data representing the top of the vehicle were captured first. In comparison, the representation of the house 708A in the first image 704A is also distorted and skewed to the left but not as much as the mile marker 706A. Finally, the representation of the telephone pole 710A does not appear distorted, even though the imaging component is moving. The difference in the amount of the distortion between the representations of the mile marker, the house, and the telephone pole is due to the different distances of those objects from the rolling shutter sensor 702A that generated the image 704A.

Similarly, the image 704B includes representations of the same objects 706, 708, 710 but the distortion of the representation of the mile marker 706B and the representation of the house 708B show the objects skewed to the left, again because the orientation of the rolling shutter sensor being such that the scan lines generate the image data from the bottom to the top of the sensor. Like the other image, the distortion of the representation 706B is greater than the distortion of the house because the mile marker is closer in distance to the rolling shutter sensor 702B.

Processing of the images to generate a depth map 712 may determine the magnitude of the difference between the opposing distortions of the same objects in the two images 704A, 704B to determine approximate distances or distance ranges between the objects and the imaging component. For example, the magnitude of the difference between the opposing distortions of the mile marker 706A and 706B is greater than the magnitude of the difference of the distortions of the house 708A and 708B. Relating back to FIG. 5, it may be determined that the magnitude of the difference between the distortions of the mile marker exceed both thresholds and the mile marker assigned to the foreground while the magnitude of the difference of the house may only exceed the first threshold and thus be assigned to the middle ground of the scene. Finally, the representations of the telephone pole 710A, 710B, which shows little to no distortion does not exceed either threshold and is assigned to the background. Using the assigned positions (foreground, middle ground, background), a depth map 712 is generated that is representative of the distances between the imaging component that includes the rolling shutter sensors 702A, 702B and the objects 706, 708, 710 in the scene 700. In this example, the foreground 714 is represented by first hatching, the middle ground 716 is represented by second hatching, and the background is represented by a cross-hatching 718. In other implementations, other representations or data may be used to represent the different positions. Likewise, as discussed above, additional or fewer positions may be utilized with the described implementations.

Use of rolling shutter sensors in opposing or different orientations provides an unexpected and technical advantage over depth sensing imaging components that use either global shutters or rolling shutter sensors that have the same orientation. Specifically, the described implementations reduce the hardware and resulting weight necessary to detect movement and depth of objects. As a result, the cost of the equipment is reduced and the ability to utilize the equipment on electrically operated aerial vehicles is enhanced due to the lighter weight when compared to global shutter solutions. Weight impacts the overall flight time. Likewise, compared to techniques that use two commonly aligned rolling shutters in which it is difficult to detect movement because the distortions between the two images is very similar, the described implementations enhance the distortion making moving objects identifiable.

Figure 8:
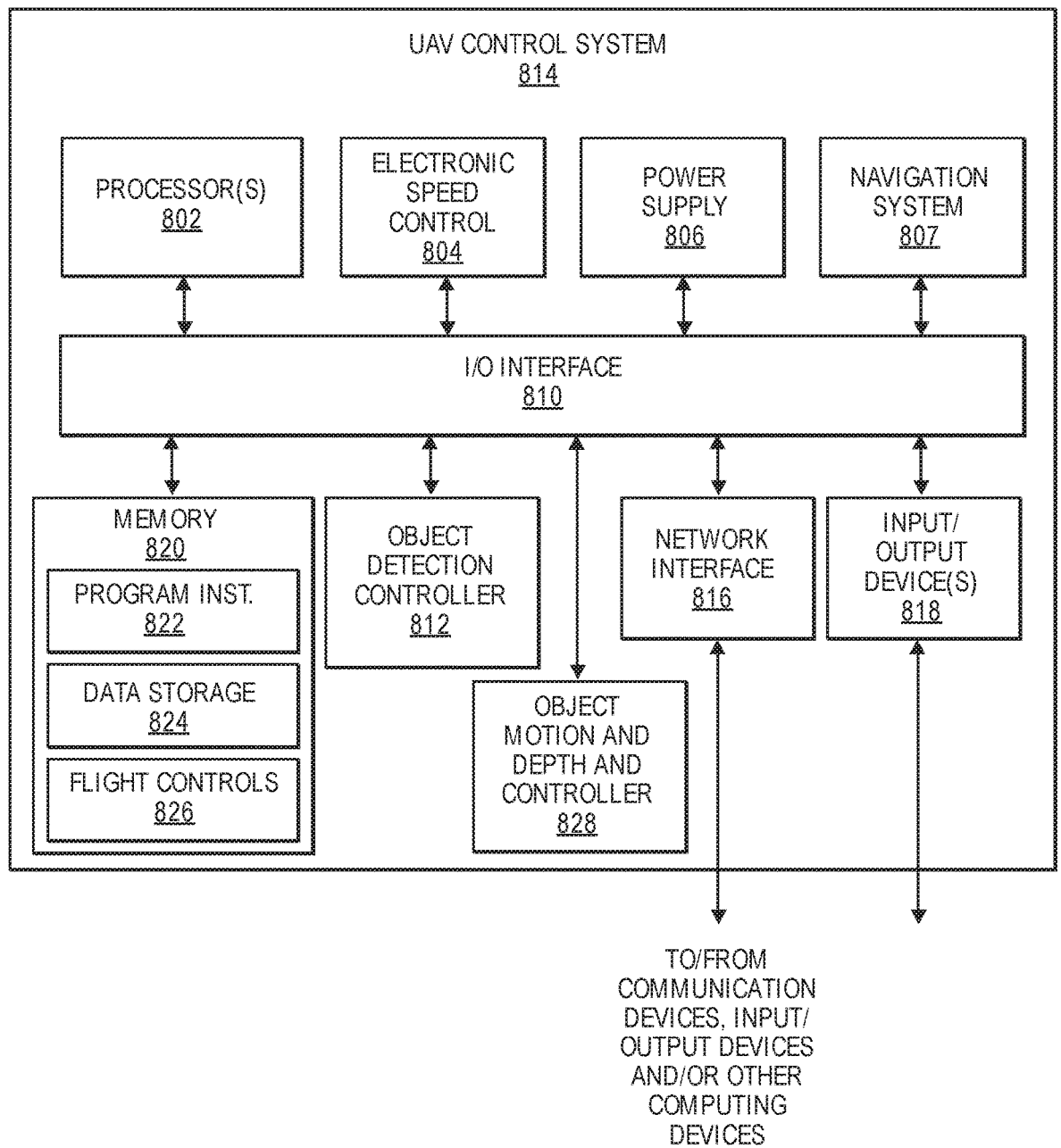
FIG. 8 is a block diagram of an illustrative implementation of an aerial vehicle control system that may be used with various implementations.

FIG. 8 is a block diagram illustrating an example UAV control system 814. In various examples, the block diagram may be illustrative of one or more aspects of the UAV control system 114 (FIG. 1) that may be used to implement the various systems and methods discussed herein and/or to control operation of the UAVs described herein. In the illustrated implementation, the UAV control system 814 includes one or more processors 802, coupled to a memory, e.g., a non-transitory computer readable storage medium 820, via an input/output (I/O) interface 810. The UAV control system 814 may also include electronic speed controls 804 (ESCs), power supply modules 806, a navigation system 807, and/or an object detection controller 812. In some implementations, the navigation system 807 may include an inertial measurement unit (IMU). The UAV control system 814 may also include a network interface 816, and one or more input/output devices 818.

In various implementations, the UAV control system 814 may be a uniprocessor system including one processor 802, or a multiprocessor system including several processors 802 (e.g., two, four, eight, or another suitable number). The processor(s) 802 may be any suitable processor capable of executing instructions. For example, in various implementations, the processor(s) 802 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 802 may commonly, but not necessarily, implement the same ISA.

The non-transitory computer readable storage medium 820 may be configured to store executable instructions, data, flight paths, flight control parameters, object signatures, and/or data items accessible by the processor(s) 802. In various implementations, the non-transitory computer readable storage medium 820 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described herein, are shown stored within the non-transitory computer readable storage medium 820 as program instructions 822, data storage 824 and flight controls 826, respectively. In other implementations, program instructions, data, and/or flight controls may be received, sent, or stored upon different types of computer-accessible media, such as non-transitory media, or on similar media separate from the non-transitory computer readable storage medium 820 or the UAV control system 814. Generally speaking, a non-transitory, computer readable storage medium may include storage media or memory media such as magnetic or optical media, e.g., disk or CD/DVD-ROM, coupled to the UAV control system 814 via the I/O interface 810. Program instructions and data stored via a non-transitory computer readable medium may be transmitted by transmission media or signals, such as electrical, electromagnetic, or digital signals, which may be conveyed via a communication medium such as a network and/or a wireless link, such as may be implemented via the network interface 816.

In one implementation, the I/O interface 810 may be configured to coordinate I/O traffic between the processor(s) 802, the non-transitory computer readable storage medium 820, and any peripheral devices, the network interface 816 or other peripheral interfaces, such as input/output devices 818. In some implementations, the I/O interface 810 may perform any necessary protocol, timing or other data transformations to convert data signals from one component (e.g., non-transitory computer readable storage medium 820) into a format suitable for use by another component (e.g., processor(s) 802). In some implementations, the I/O interface 810 may include support for devices attached through various types of peripheral buses, such as a variant of the Peripheral Component Interconnect (PCI) bus standard or the Universal Serial Bus (USB) standard, for example. In some implementations, the function of the I/O interface 810 may be split into two or more separate components, such as a north bridge and a south bridge, for example. Also, in some implementations, some or all of the functionality of the I/O interface 810, such as an interface to the non-transitory computer readable storage medium 820, may be incorporated directly into the processor(s) 802.

The ESCs 804 communicate with the navigation system 807 and adjust the rotational speed of each lifting motor and/or the thrusting motor to stabilize the UAV and guide the UAV along a determined flight path. The navigation system 807 may include a GPS, indoor positioning system (IPS), IMU or other similar systems and/or sensors that can be used to navigate the UAV 100 to and/or from a location. The object detection controller 812 communicates with memory 820 and the imaging device discussed above and may process information to determine if objects are present in the images. Likewise, the object motion and depth controller 828 may likewise communicate with memory 820 and the imaging device discussed above and may process information to determine if objects represented in the images are moving with respect to the imaging device and/or to determine depth information for those objects.

The network interface 816 may be configured to allow data to be exchanged between the UAV control system 814, other devices attached to a network, such as other computer systems (e.g., remote computing resources), and/or with UAV control systems of other UAVs. For example, the network interface 816 may enable wireless communication between the UAV that includes the control system 814 and a UAV control system that is implemented on one or more remote computing resources. For wireless communication, an antenna of a UAV or other communication components may be utilized. As another example, the network interface 816 may enable wireless communication between numerous UAVs. In various implementations, the network interface 816 may support communication via wireless general data networks, such as a Wi-Fi network. For example, the network interface 816 may support communication via telecommunications networks, such as cellular communication networks, satellite networks, and the like.

Input/output devices 818 may, in some implementations, include one or more displays, imaging devices, thermal cameras, infrared sensors, time of flight sensors, accelerometers, pressure sensors, weather sensors, cameras, gimbals, landing gear, etc. Multiple input/output devices 818 may be present and controlled by the UAV control system 814. One or more of these sensors may be utilized to assist in landing as well as to avoid obstacles during flight.

As shown in FIG. 8, the memory may include program instructions 822, which may be configured to implement the example routines and/or sub-routines described herein. The data storage 824 may include various data stores for maintaining data items that may be provided for determining flight paths, object detection, landing, identifying locations for disengaging items, engaging/disengaging the thrusting motors, etc. In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the UAV control system 814 is merely illustrative and is not intended to limit the scope of the present disclosure. In particular, the computing system and devices may include any combination of hardware or software that can perform the indicated functions. The UAV control system 814 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated UAV control system 814. Some or all of the system components or data structures may also be stored (e.g., as instructions or structured data) on a non-transitory, computer-accessible medium or a portable article to be read by an appropriate drive. In some implementations, instructions stored on a computer-accessible medium separate from the UAV control system 814 may be transmitted to the UAV control system 814 via transmission media or signals such as electrical, electromagnetic, or digital signals, conveyed via a communication medium such as a wireless link. Various implementations may further include receiving, sending, or storing instructions and/or data implemented in accordance with the foregoing description upon a computer-accessible medium. Accordingly, the techniques described herein may be practiced with other UAV control system configurations.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, communications, and image processing should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some or all of the specific details and steps disclosed herein.

While the above examples have been described with respect to aerial vehicles, the disclosed implementations may also be used for other forms of vehicles, including, but not limited to, ground based vehicles and water based vehicles.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the modules and engines may be implemented in firmware or hardware.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

As used throughout this application, the word "may" is used in a permissive sense (i.e., meaning having the potential to), rather than the mandatory sense (i.e., meaning must). Similarly, the words "include," "including," and "includes" mean including, but not limited to. Additionally, as used herein, the term "coupled" may refer to two or more components connected together, whether that connection is permanent (e.g., welded) or temporary (e.g., bolted), direct or indirect (e.g., through an intermediary), mechanical, chemical, optical, or electrical. Furthermore, as used herein, "horizontal" flight refers to flight traveling in a direction substantially parallel to the ground (e.g., sea level), and that "vertical" flight refers to flight traveling substantially radially outward from or inward toward the earth's center. It should be understood by those having ordinary skill that trajectories may include components of both "horizontal" and "vertical" flight vectors.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. An aerial vehicle, comprising:
    a frame;
    a plurality of propulsion mechanisms to aerially lift and navigate the aerial vehicle;
    an imaging component, including:
        a first rolling shutter sensor having a first plurality of scanlines, the first rolling shutter sensor having a first orientation such that the first plurality of scanlines produce image segments from a first top of the first rolling shutter sensor to a first bottom of the first rolling shutter sensor in a time sequence to produce a first image of a scene;
        a second rolling shutter sensor having a second plurality of scanlines, the second rolling shutter sensor having a second orientation such that the second plurality of scanlines produce image segments from a second bottom of the second rolling shutter sensor to a second top of the second rolling shutter sensor in the time sequence to produce a second image of the scene; and
    an image-processing component, configured to at least:
        receive the first image and the second image;
        compare the first image and the second image to at least:
            detect a first object represented in the first image having a first distortion caused by the first top to the first bottom generation of the first image by the first rolling shutter sensor; and
            detect the first object represented in the second image having a second distortion caused by the second bottom to the second top generation of the second image by the second rolling shutter sensor;
        determine a first distance between the imaging component and the first object;
        generate a depth map representative of at least the first distance;
        detect a second object represented in the first image;
        detect the second object represented in the second image;
        determine that there is no opposing distortion of the second object between the first image and the second image;
        determine that the aerial vehicle is moving; and
        determine based on the no opposing distortion of the second object and the aerial vehicle is moving, that the second object is moving with the aerial vehicle.

2. The aerial vehicle of claim 1, wherein the image-processing component is further configured to at least:
    determine that a difference between the first distortion and the second distortion exceeds a threshold; and
    assign a first depth map placement as representative of the first object; and
    include the first depth map placement in the depth map as representative of the scene.

3. The aerial vehicle of claim 2, wherein the first depth map placement corresponds to at least one of a foreground or a middle ground of the scene.

4. The aerial vehicle of claim 1, wherein the image-processing component is further configured to at least:
    compare the first image and the second image to at least:
        determine a second distance between the imaging component and the second object, wherein the second distance is greater than the first distance; and
        generate the depth map indicating that the first object is closer to the imaging component than the second object.

5. An image capture apparatus, comprising:
    a frame;
    a first rolling shutter sensor coupled to the frame at a first orientation such that imaging of a scene by a first plurality of scanlines of the first rolling shutter sensor proceeds in a first direction to produce a first image;
    a second rolling shutter sensor coupled to the frame at a second orientation that is different than the first orientation such that imaging of the scene by a second plurality of scanlines of the second rolling shutter sensor proceeds in a second direction to produce a second image, wherein the second direction is different than the first direction; and
    a processing component configured to at least:
        receive the first image and the second image;
        compare the first image and the second image to determine a first object having a first distortion in the first image and a second distortion in the second image;
        determine that the first distortion and the second distortion are not opposing distortions;
        in response to determination that the first distortion and the second distortion are not opposing distortions, determine that the first object is not moving with respect to the image capture apparatus;
        compare the first image and the second image to determine a second object having a third distortion in the first image and a fourth distortion in the second image;

determine that the third distortion and the fourth distortion are opposing distortions; and in response to determination that the third distortion and the fourth distortion are opposing distortions, determine that the second object is moving with respect to the image capture apparatus.

6. The image capture apparatus of claim 5, wherein the processing component is further configured to at least:

determine that the image capture apparatus is moving;

adjust at least one of the third distortion or the fourth distortion to correct for the movement of the image capture apparatus; and determine, subsequent to adjusting, a difference between the adjusted third distortion and the adjusted fourth distortion; and determine based at least in part on the difference, that the second object is moving.

7. The image capture apparatus of claim 5, wherein the processing component is further configured to at least:

determine that the image capture apparatus is moving;

adjust at least one of the first distortion or the second distortion of to correct for the movement of the image capture apparatus; and determine, subsequent to adjusting, a difference between the adjusted first distortion and the adjusted second distortion; and determine based at least in part on the difference, that the first object is not moving.

8. The image capture apparatus of claim 5, wherein the processing component is further configured to at least:

determine that the image capture apparatus is not moving; and determine based on the no opposing distortion between the first distortion and the second distortion and the image capture apparatus not moving, that the first object is not moving.

9. The image capture apparatus of claim 5, wherein the processing component is further configured to at least:

determine that the image capture apparatus is moving; and determine based on the no opposing distortion between the first distortion and the second distortion and the image capture apparatus moving, that the first object is moving with the image capture apparatus.

10. The image capture apparatus of claim 5, wherein the processing component is further configured to at least:

process the first image using one or more image processing algorithms to detect the first object represented in the first image.

11. The image capture apparatus of claim 5, wherein the image capture apparatus is coupled to an aerial vehicle, a ground based vehicle, or a water based vehicle.

12. A method to detect an object that is moving with respect to an image capture device, the method comprising:

generating a first image of a scene with a first rolling shutter sensor of an image capture device, the first rolling shutter sensor oriented in a first direction such that imaging of the scene by a first plurality of scanlines of the first rolling shutter sensor proceeds in a first direction to produce a first image;

generating a second image of a scene with a second rolling shutter sensor of the image capture device, the second rolling shutter sensor oriented in a second direction such that imaging of the scene by a second plurality of scanlines of the second rolling shutter sensor proceeds in a second direction to produce a second image;

determining a first distortion of a first object represented in the first image;

determining a second distortion of the first object represented in the second image;

determining that the first distortion is different than the second distortion;

determining, based at least in part on the determination that the first distortion is different than the second distortion, that the object is moving with respect to the image capture device;

determining that there is no opposing distortion of a second object between the first image and second image, wherein the second object is represented in the first image and the second image;

determining that the image capture device is not moving; and determining based on the no opposing distortion of the second object and the image capture device not moving, that the second object is not moving.

13. The method of claim 12, further comprising:

adjusting for the movement of the first object with respect to the image capture device; and producing a depth map of the scene.

14. The method of claim 12, further comprising:

determining, based at least in part on a magnitude of a difference between the first distortion and the second distortion, an approximate distance between the first object and a vehicle.

15. The method of claim 12, further comprising:

providing the first image and the second image to a neural network; and wherein the neural network performs at least one of:

determining a first distortion of a first object represented in the first image;

determining a second distortion of the first object represented in the second image;

determining that the first distortion is different than the second distortion; and determining, based at least in part on the determination that the first distortion is different than the second distortion, that the first object is moving with respect to the image capture device.

16. The method of claim 12, further comprising:

altering a navigation of a vehicle, based at least in part on determining that the first object is moving with respect to the image capture device.

17. The image capture apparatus of claim 5, wherein the processing component is further configured to at least:

determine that a first difference between the first distortion and the second distortion does not exceed a threshold;

in response to determination that the first difference does not exceed the threshold, assign the first object to a background; and generate a depth map that represents the first object according to the assigned background.

18. The image capture apparatus of claim 17, wherein the processing component is further configured to at least:

determine that a second difference between the third distortion and the fourth distortion exceeds the threshold;

in response to determination that the second difference exceeds the threshold, assign the second object to a foreground; and generate the depth map that represents the first object according to the assigned background and represents the second object according to the assigned foreground.

19. The image capture apparatus of claim 18, wherein the first object assigned to the background is represented by a first color in the depth map and the second object assigned to the foreground is represented by a second color in the depth map, wherein the first color is different than the second color.

\* \* \* \* \*